United States Patent
Pillinger

(10) Patent No.: US 6,796,665 B1
(45) Date of Patent: Sep. 28, 2004

(54) LAMINATED ANTI-FOGGING MIRROR ASSEMBLY

(76) Inventor: Barry Ernest Pillinger, Unit 8, 19 Expo Court, Ashmore, Queensland 4214 (AU)

( * ) Notice: Subject to any disclaimer, the term of this patent is extended or adjusted under 35 U.S.C. 154(b) by 72 days.

(21) Appl. No.: 10/070,663

(22) PCT Filed: Sep. 8, 2000

(86) PCT No.: PCT/AU00/01063

§ 371 (c)(1),
(2), (4) Date: Jul. 22, 2002

(87) PCT Pub. No.: WO01/19140

PCT Pub. Date: Mar. 15, 2001

(30) Foreign Application Priority Data

Sep. 9, 1999 (AU) ............................................. PQ2720

(51) Int. Cl.[7] .............................................. G02B 5/12
(52) U.S. Cl. ........................ 359/512; 359/511; 359/513
(58) Field of Search ................................ 359/512, 511, 359/513; 219/202, 213, 219, 522, 528, 543

(56) References Cited

U.S. PATENT DOCUMENTS

| | | | |
|---|---|---|---|
| 2,564,836 A | | 8/1951 | Elsenheimer ................ 219/19 |
| 3,597,586 A | | 8/1971 | Rebovich .................... 219/219 |
| 3,790,748 A | * | 2/1974 | Van Laethem et al. ..... 219/219 |
| 3,839,620 A | * | 10/1974 | Seibel et al. ................ 219/219 |
| 3,887,788 A | * | 6/1975 | Seibel et al. ................ 219/219 |
| 3,956,559 A | * | 5/1976 | Wildorf ....................... 428/214 |
| 4,060,712 A | | 11/1977 | Chang ......................... 219/219 |
| 4,634,242 A | * | 1/1987 | Taguchi et al. ............. 359/512 |
| 4,665,304 A | | 5/1987 | Spencer ...................... 219/219 |
| 4,910,388 A | * | 3/1990 | Lorenz et al. .............. 219/543 |
| 4,933,533 A | | 6/1990 | Simpson ..................... 219/219 |
| 4,940,317 A | | 7/1990 | Reuben | |
| 5,083,009 A | | 1/1992 | Reiser et al. ............... 219/219 |
| 5,347,106 A | | 9/1994 | Reiser et al. ............... 219/219 |
| 5,380,981 A | * | 1/1995 | Feldman et al. ............ 219/219 |
| 5,408,069 A | | 4/1995 | Mischel ...................... 219/219 |
| 5,731,569 A | | 3/1998 | Crescenzo .................. 219/219 |
| 6,034,353 A | | 3/2000 | Demeester .................. 219/203 |
| 6,425,670 B1 | * | 7/2002 | Komatsu et al. ............ 359/507 |

FOREIGN PATENT DOCUMENTS

| | | |
|---|---|---|
| CA | 2100050 | 1/1995 |
| CN | 2254612 Y | 5/1997 |
| EP | 0 670 665 | 9/1995 |
| EP | 0 893 938 | 1/1999 |
| FR | 2 770 737 | 5/1999 |
| JP | 10317330 | 12/1998 |
| JP | 11167001 | 6/1999 |
| JP | 11314943 | 11/1999 |
| WO | WO 80/02678 | 12/1980 |

OTHER PUBLICATIONS

Derwent Abstract Accession No. 2000–278848/24, X25, JP 2000077173–A (Asahi Glass Co Ltd) Mar. 14, 2000.

* cited by examiner

Primary Examiner—Mohammad Sikder
(74) Attorney, Agent, or Firm—Finnegan, Henderson, Farabow, Garrett & Dunner, L.L.P.

(57) ABSTRACT

An anti-fogging mirror assembly (10) comprises a mirrored sheet (12), a second sheet (16), and a bonding medium (18) adapted to bond together the mirrored sheet (12) and the second sheet (16). The bonding medium (18) has embedded In it a heating pad (20) in the form of an electrical resistance heating element, which, when it Is supplied with electrical energy, heats the mirrored sheet (12) such that any moisture on the mirrored sheet (12) is be evaporated, and condensation of moisture on the mirrored sheet (12) is prevented. The heating element (20) may be in the form of a polyester substrate printed with a conductive ink, and electrical energy to the heating element (20) may be supplied through upper (68) and lower (26) bus bars. A thermostat (54) may be provided such that when the heating element (20) reaches a predetermined temperature, electrical energy is no longer supplied to the heating element (20).

13 Claims, 2 Drawing Sheets

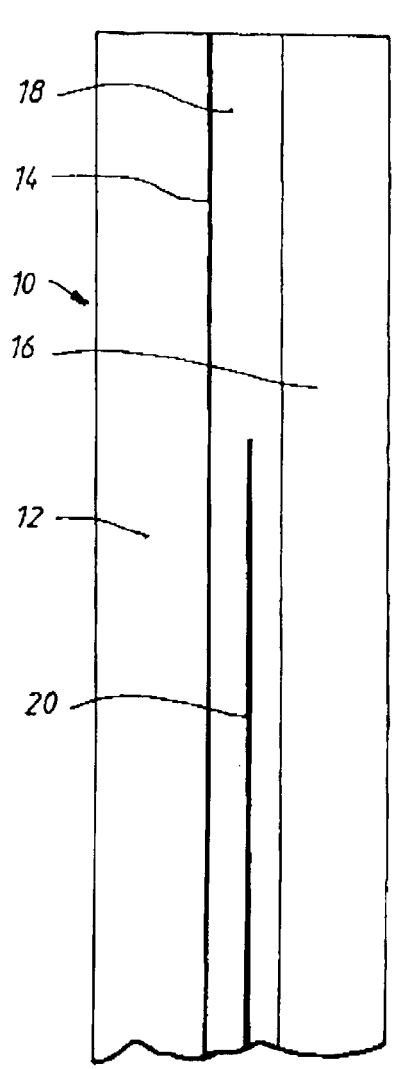
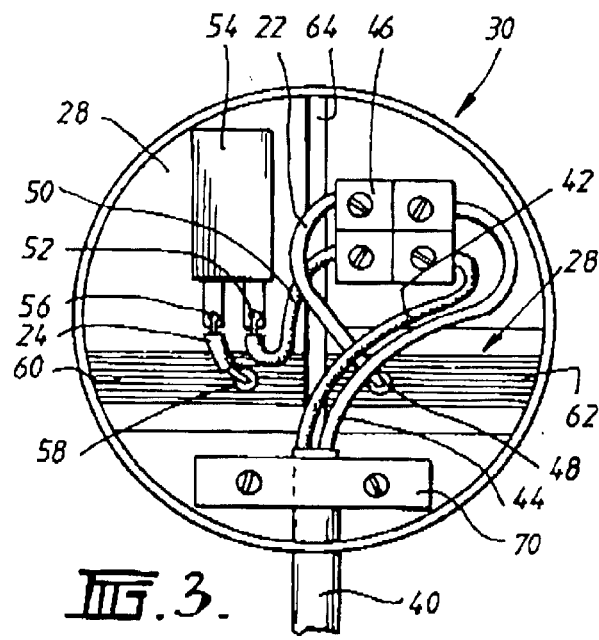
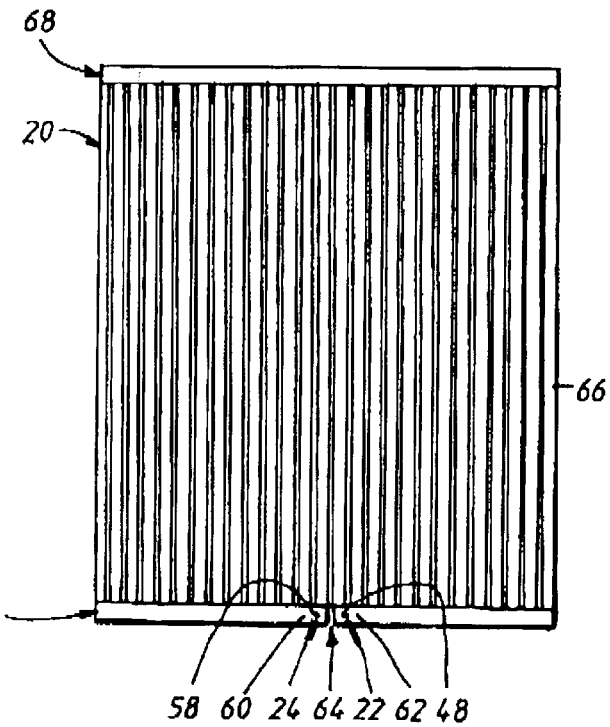

LAMINATED ANTI-FOGGING MIRROR ASSEMBLY

BACKGROUND OF THE INVENTION

This Invention relates to mirrors, and in particular relates to the removal of condensation from mirrors.

A bathroom usually features at least one mirror, which is used for shaving, combing the hair, the application of cosmetics, and so on. However, the nature of bathrooms is such that steam is generated by showers, baths and/or hot water in a basin, such basins being often situated directly beneath a mirror. The same situation applies to areas adjoining spas, saunas, steam rooms and the like, in commercial and domestic situations. The result is that even when an extractor is used to vent air and steam from a bathroom or similar area, condensation tends to form on mirrors, resulting in the restriction of the reflected image and an unsightly appearance. Attempts to clear the mirror by the use of an accessible item such as a towel, are generally unsatisfactory and are often a cause of further annoyance.

As early as 1949, a "non-blurabble mirror" was being suggested, to prevent or remove condensation. U.S. Pat. No. 2,564,836 discloses a mirror in which an electrical heating unit is located at the rear surface of the mirror, the heating unit incorporating a layer of an electrically conductive rubber composition. When actuated, the heating element heats the rear surface of the mirror, then the front surface, as a result of which vapour condensation or moisture on the front surface is prevented or removed.

Subsequent condensation-free mirror arrangements have had generally similar arrangements, in which resistance heating has been used to heat the mirror to remove condensation therefrom. U.S. Pat. No. 3,887,788 of 1972, discloses a condensation-free mirror in which a printed circuit board heating element is mounted on the rear surface of a mirror. U.S. Pat. No. 4,060,712 of 1976 shows a heated mirror arrangement in which a heating element is woven horizontally on an insulation plate, and has a centrally enlarged portion to enable the temperature to be the same at all portions of the front face of the mirror.

U.S. Pat. No. 5,347,106 of 1992 discloses a mirror assembly which uses a reflective coating as a heating element for preventing fog formation on a mirror exposed to a humid environment, U.S. Pat. No. 5,731,569 shows a device for attachment to a mirror to prevent the formation of condensation thereon, the device including a pad element containing a heat-retaining gel and a heating element located in the gel. Numerous other prior patent specifications from, particularly, the 1970s, indicated that no one inventor has found the optimal non-fogging mirror arrangement.

It is an object of this invention to provide an improved condensation prevention and/or removal arrangement for a mirror.

SUMMARY OF THE INVENTION

The invention provides an anti-fogging mirror assembly, characterised in that said assembly includes first sheet means, second sheet means, and a bonding medium adapted to bond together said first sheet means and said second sheet means, in that said bonding medium is associated with heating means, said heating means being adapted to heat at least part of said assembly, and in that one of said first sheet means and said second sheet means is a mirrored sheet means.

The invention also provides a method of producing an anti-fogging mirror assembly, characterised by the steps of:

assembling first sheet means and second sheet means, said first sheet means being mirrored sheet means, with a gap between said first sheet means and said second sheet means;

locating heating means in said gap; and filling at least part of said gap with a bonding medium, such that said first sheet means and said second sheet means are bonded together, and such that said heating means is embedded in said bonding medium.

BRIEF DESCRIPTION OF THE DRAWINGS

Embodiments of the invention, which may be preferred, will be described in detail hereinafter, with reference to the accompanying drawings, in which:

FIG. 1 is a side elevation of part of a laminated mirror glass assembly, incorporating heating means, in accordance with an embodiment of the present invention;

FIG. 3 is a plan view of one form of electrical connection which may be used with the mirror glass assembly of FIGS. 1 and 2; and FIG. 4 is a plan view of one form of heating element arrangement for use in the assembly of FIGS. 1 to 3.

DETAILED DESCRIPTION OF THE INVENTION

Figure 2:
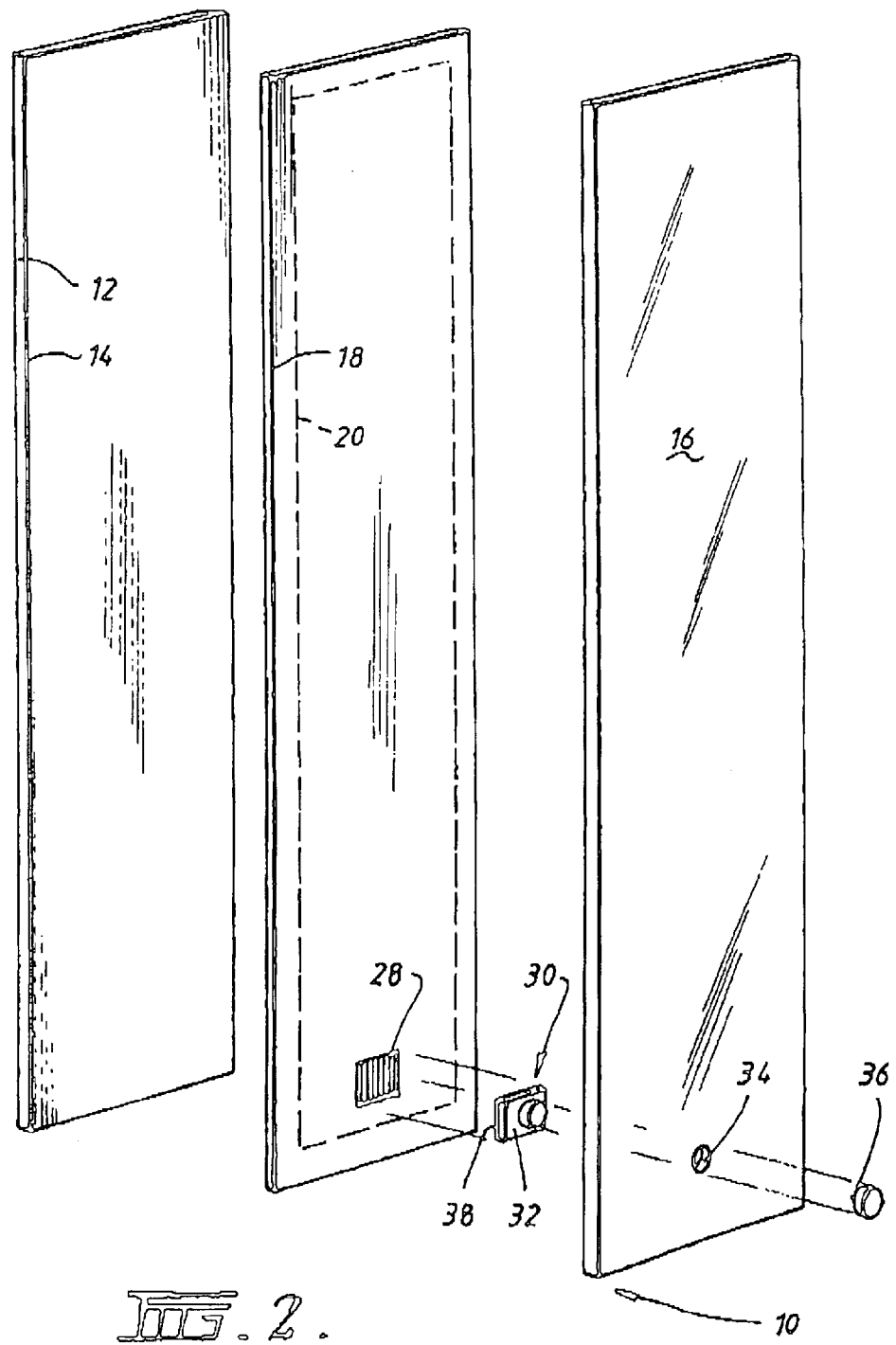
FIG. 2 is an exploded view of the mirror glass assembly of FIG. 1.

The present invention has for its aim an anti-fogging mirror assembly of components ad materials, which will inhibit the formation of condensation on the mirror surface, while also incorporating a safety feature.

Turning firstly to FIG. 1, the illustrated embodiment of a condensation-free mirror arrangement 10 includes a sheet of mirror glass 12 having a reflective coating 14 at the rear surface thereof. A sheet of translucent glass 16 is located to the rear of reflective coating 14. Sheets 12 and 16 are bonded together by a bonding medium 18, in which a heating element 20 is located.

The mirror assembly 10 in its simplest form, that shown in FIG. 1, may be seen as a lamination of two sheets of glass (12, 16) by a bonding agent (18), thus forming a laminated sheet (10) of material, which includes a heating element 20 embedded in the bonding medium.

FIG. 2 shows in exploded form a more detailed view of the condensation-free mirror arrangement 10 of FIG. 1. In FIG. 2, the three sheets, the sheet of mirror glass 12, the translucent sheet of glass 16, and the bonding medium 18 (in a solidified form) are shown in a preferred situation in which at least the external dimensions of the sheets 12, 16 are substantially identical. More preferably, the mirror glass sheet 12 may vary in thickness from about 2 mm to about 6 mm, and the translucent glass sheet 16 may preferably be about 3 mm in thickness. Glass sheet 16 preferably has a generally circular aperture 34 therein, near the base thereof, for the supply of electrical power to the heating element 20, as will be described hereinafter.

Bonding medium 18 bonds sheets 12, 16 together. It is to be understood that sheets 12, 16 may be formed from any suitable material, but that glass is preferred. It may well be that at least sheet 16 may be made from an alternative material. Preferably, the bonding medium 18 is a semi-translucent rapid cure resin material. The thickness of the bonding medium 18 in the assembly 10 may accordingly be within the limits of the manufacturers specifications, and preferably would be within a nominal maximum thickness of about 1.8 mm. One additional advantage of the laminate of assembly 10 is that the bonding medium 18 protects reflective surface 14 from damage.

The heating means for the mirror assembly 10 is preferably in the form of an electrical resistance heating element 20, depicted by broken lines in FIG. 2. More preferably, the heating element 20 is of a type which incorporates a polyester film substrate printed with a conductive vinyl baked ink with one or more bus bars (preferably of copper, which may be tinned, but alternatively of solder or silvered, or of conductive foil) located near the outer edges of the opposite sides of the conductive ink, which may be covered by an insulation layer (not shown), similar to the substrate, with a selvedge (not shown) protruding beyond the bus bars. A particular example of such a heating element 20 is shown and will be subsequently described in relation to FIG. 4.

The heating element 20 will preferably be prepared prior to the lamination process by suitably affixing (preferably by soldering) electrical leads 22 and 24 (FIG. 3) to a bus bar 26 (FIGS. 3 and 4). The thickness of the heating element 20 will be minimal, particularly in relation to the thickness of the sheets 12, 16 and the bonding medium 18; the thickest section is anticipated to be near the bus bars 26, 68, where it may be in the vicinity of about 300 microns.

Alternative heating elements may be used, in which other conductive media such as foil conductive material may have terminal connections similarly closely positioned. The dimensions of the heating element 20 may be varied, and may be in the form of a singular sheet in the form of multiple sheets suitably connected for satisfactory connection to electrical power, and satisfaction of assembly. Preferably, the external dimensions of the heating element 20 will be less than those of sheets 12, 16, so that a border is created around the outer periphery of the element 20, to enable the element 20 to be visible through the bonding medium 18 and the translucent sheet 16. The border may have a width of about 100 mm to permit an uninterrupted view of the element 20.

One form of heating element of the foil type does not require a bus bar, and has a "maze" pattern, and as a consequence the terminal points for the connection of the element to a source of electrical energy may be located in any position, although a preference would be for a connection along any one outer edge of the pattern. The use of such an alternative heating element would enable the position of the electrical connection to be altered from the position shown in the embodiment of FIGS. 3 and 4.

The assembly 10, which has been stated is in the form of a laminate, may be produced in any suitable manner. One method of producing the laminate is to locate sheets 12, 16 a predetermined distance from each other, with sheet 16 to the rear of mirrored sheet 12. Heating pad 20 is located in the gap between sheets 12 and 16, and is held in registration in that position by the location of part of a junction facility 30, to be described hereinafter, in aperture 34 in sheet 16.

Three sides of the preliminary assembly of sheets 12 and 16 and heating pad 20 may be closed, for example by placing adhesive tape along three sides of the gap between the sheets 12 and 16 to close off the gap along those sides, with the open side at the top of the preliminary assembly. A preferred tap may be narrow-width 3M (Trade Mark) double-sided adhesive tape. The bonding material 18, in the form of a liquid rapid-cure resin material, may then be poured in through the top, until it reaches a predetermined level, The top gap may also then be sealed with adhesive tape or the like, and the preliminary assembly is then laid flat until the resin cures, at which time the assembly 10 is created.

In FIG. 2 an exposed section 28 of heating element 20 is shown, which section includes sections 60, 62 of bus bar 26 (FIG. 4). A junction facility 30, which may be a preferred form of connecting heating element 20 to a source of electrical power, is also shown. A flanged base portion 32 of junction facility 30 is intended to be attached to the exposed portion 28 of heating element 20. The base portion includes a planar part and a cylindrical part, the latter being adapted to protrude, in the final assembly 10, through a circular aperture 34 in translucent sheet 16. The junction facility 30 may be formed from any suitable material from which a similar unit, such as an electrical terminal block, may be formed. One preferred material may be polyvinyl chloride (PVC).

Base portion 32 is preferably attached to exposed portion 28 of heating element by means of pressure sensitive adhesive means 38 or by any other suitable method. The electrical connection will be described with reference to the description relating to FIGS. 3 and 4. In the mirror assembly 10, a cover 36 will be placed on that part of base portion 32 which protrudes through the aperture 34 in sheet 16.

FIG. 3 shows one form of Junction facility 30 for electrically connecting heating element 20 to a source of electrical power. A power cord 40 supplies electrical power, and may be physically clamped to the junction facility 30 by a "saddle" or other cord anchor 70. The wires 42, 44 of power cord 40 are connected to a terminal connecting device 46. Lead 22, which is connected to wire 44 through block 46, is connected to terminal 48 on one section of bus bar 28. Lead 50, which is electrically connected to wire 42 through block 46, is connected to terminal 52 of thermostat 54. Lead 24 connects terminal 56 of thermostat 54 to terminal 68 on another section of bus bar 28.

The exemplary heating element 20 of FIG. 4 is suitable for use with the assembly of FIGS. 1 and 2, and with the junction facility 30 of FIG. 3 it may have the specifications of the "Flexel Model Mk 4" produced by Flexel International Limited of the United Kingdom. The element 20 includes the aforementioned printed vinyl ink portion 66, which has a preferred pattern of vertical lines, and which is connected to upper (68) and lower (26) bus bars, which as has been stated previously, are preferably formed from copper. Bus bar 26 has a portion cut out at 64, preferably around the centre thereof. That facilitates the connection of leads, in a manner to be described hereinafter, to the bus bar 26 at respective locations thereon. This results in the flow of electricity through the bus bar 26 to one side of the cutout 64, there being a void section between the printed lines of the ink 66, the void section being directly above the cutout 64, to the opposite bus bar 68, and then through the other portion of ink 66 to the other part of bus bar 26. An alternative heating element may include three bus bars, instead of two. Such an arrangement would enable the heating element to be operated at the Australian/UK voltage of 220V/240V AC, or the United States (and other countries) voltage of 110V AC.

Terminals 48, 58 are on separated portions 60, 62 of bus bar 26 of heating element 20, the separated portions 60, 62 having been electrically separated from each other, by cutting or otherwise separating bus bar 26 at 64 (FIG. 4). Separated portions 60, 62 are revealed by exposed portion 28 of heating element 20. The exposed portion 28 of heating element 20 is accessible through the open end of the flanged junction facility 30. This method of connecting power to a heating element is known as a "2-in-series" connection.

It is to be understood that the particular means by which the wiring connection for providing power to one or more heating elements may be varied according to the type of element or elements used. In addition, a second access point to heating element 20 may be provided.

Thermostat 64 is a non-essential feature of junction facility 30. A basic assembly 10 may not include a thermostat 54, in which case lead 42 may directly connect to terminal 58, and lead 44 may connect directly to terminal 48. However, a thermostat such as thermostat 54 is preferred. The thermostat 54 is adapted to be attached to heating element 20 such that the temperature of the element 20 activates the thermostat 64. When the temperature of the element 20, at the point where it is connected to thermostat 54, reaches a predetermined level, the electric circuit powering the element 20 will be opened, switching off the electrical power until the temperature drops below the predetermined level. At that time, the bi-metal contacts (not shown) of thermostat 54 will close to again allow electricity to flow to the heating element 20.

The thermostat 54 may be of the self-enclosed heat sensing type or may have an external sensor which may extend to another section of heating element 20 or of the assembly 10, such as the mirrored sheet 12. In such an arrangement, the thermostat 64 does not need to be affixed to the surface of the heating element 20.

A further embodiment of the invention, which may be preferred, includes the provision of a fuse, either of a conventional fuse-wire type or of a circuit-breaker type, which when overloaded will cut the supply of electricity to the heating element 20. Another embodiment of the invention envisages allowing the temperature of the heating element 20 to change (in particular rise) at the same rate as the ambient temperature, by the use of a self-regulating element which has a high resistance to prevent overheating, and which may accordingly result in a thermostat not necessarily being fitted to the assembly 10.

Removable cover 36 of junction facility 30 is preferably fashioned to permit the two-core power cord 40 to enter the junction facility 30. Furthermore, if a fuse is to be used, it may be integrated into the circuit, and housed within the junction facility 30.

The final assembly 10, in the form of a laminate, is designed to be used as an anti-fogging and condensation-free mirror. When the heating pad 20 is energised, it will heat the assembly 10, in particular the mirrored sheet 12. When the mirrored sheet 12 is so heated, any moisture on the mirror, which may be fogging the mirror, will be evaporated, and the mirror will then become clear. Alternatively or additionally, when the mirrored sheet 12 is heated, moisture such as steam, which is present at certain times in the air of a bathroom, will not be able to condense on the mirror, and fog the mirror. The mirror will accordingly stay clear.

The fact that the assembly 10 is in the form of a laminate means that it is also a safety mirror, one which will not shatter into dangerous shards of glass if broken. Preferably, the outer edges of the mirror sheet may be clean cut, smooth-edged or bevelled, and the assembly 10 may be wail-mounted by the use of a satisfactory technique, or may be enclosed in a frame or the like in a suitable manner, The latter arrangement may involve the addition of a layer of insulation, most likely at the rear of the assembly 10, and/or the addition of a satisfactory backing board. However, access to the junction facility 30 must be able to be maintained.

It can be seen that this invention provides an improved anti-fogging mirror assembly in the form of a safety laminate.

The entire contents of the specification and drawings of Australian provisional patent application no. PQ2720, filed on 9 Sep. 1999, are hereby incorporated into the disclosure of this specification.

The claims form part of the disclosure of this specification.

What is claimed is:

1. An anti-fogging mirror assembly, comprising first sheet means, second sheet means, a bonding medium adapted to bond together said first sheet means and said second sheet means, and heating means embedded within said bonding medium, said heating means being adapted to heat at least part of said assembly and one of said first sheet means and said second sheet means being a mirrored sheet means.

2. The anti-fogging mirror assembly according to claim 1, wherein said heating means is adapted to heat said mirrored sheet means so that any moisture on said mirrored sheet means is evaporated, and so that moisture is prevented from forming on said mirrored sheet means.

3. The anti-fogging mirror assembly according to claim 1, wherein said heating means is an electric resistance heating element.

4. The anti-fogging mirror assembly according to claim 3, wherein said electric resistance heating element is a film substrate with a conductive ink printed thereon.

5. The anti-fogging mirror assembly according to claim 3, wherein said electric resistance heating element is a foil with maze pattern.

6. The anti-fogging mirror assembly according to claim 1, wherein said assembly is in the form of a laminated sheet assembly.

7. The anti-fogging mirror assembly according to any one of claims 3 to 5, wherein electrical power is supplied to said heating element through a junction facility.

8. The anti-fogging mirror assembly according to claim 3, wherein a thermostat is located in an electrical circuit for supplying electric power to said heating element, said thermostat monitoring the temperature of said heating element.

9. The anti-fogging mirror assembly according to claim 8, wherein a fuse is located in the electrical circuit supplying electrical power to said heating element.

10. The anti-fogging mirror assembly according to claim 6 wherein said assembly is located in a frame or support.

11. A method of producing an anti-fogging mirror assembly, comprising the steps of:
    assembling first sheet means and second sheet means, said first sheet means being mirrored sheet means, with a gap between said first sheet means and said second sheet means;
    locating heating means in said gap; and
    filling at least part of said gap with a bonding medium, such that said first sheet means and said second sheet means are bonded together and heating means is embedded in said bonding medium.

12. The method according to claim 11, wherein said heating means is an electrical resistance heating element.

13. An anti-fogging mirror assembly produced by the method according to claim 11 or claim 12.

* * * * *